United States Patent [19]

Kazami et al.

[11] Patent Number: 5,502,527
[45] Date of Patent: Mar. 26, 1996

[54] CAMERA CAPABLE OF MAGNETIC RECORDING

[75] Inventors: Kazuyuki Kazami, Tokyo; Hideo Hibino, Kawasaki; Norikazu Yokonuma, Yokohama; Youichi Yamazaki, Kawasaki; Junichi Yanai, Chigasaki, all of Japan

[73] Assignee: Nikon Corporation, Tokyo, Japan

[21] Appl. No.: 364,395

[22] Filed: Dec. 23, 1994

Related U.S. Application Data

[63] Continuation of Ser. No. 214,632, Mar. 18, 1994, abandoned.

[30] Foreign Application Priority Data

Mar. 19, 1993 [JP] Japan .................................. 5-060418

[51] Int. Cl.⁶ .................................................. G03B 17/24
[52] U.S. Cl. ................................. 354/106; 360/1; 360/22
[58] Field of Search ................................... 354/105, 106, 354/207; 360/1, 3, 22, 23, 47, 51

[56] References Cited

U.S. PATENT DOCUMENTS

| | | | |
|---|---|---|---|
| 4,832,275 | 5/1989 | Robertson | 354/275 X |
| 4,864,332 | 9/1989 | Harvey | 354/105 X |
| 5,006,873 | 4/1991 | Wash | 354/106 |
| 5,229,810 | 7/1993 | Cloutier et al. | 354/106 X |
| 5,376,981 | 12/1994 | Itoh | 354/106 |

*Primary Examiner*—Howard B. Blankenship
*Attorney, Agent, or Firm*—Oliff & Berridge

[57] ABSTRACT

A camera capable of magnetic recording information on a first magnetic recording region and a second magnetic recording region provided on a film, comprises: a signal generating circuit which generates a first recording signal having a first frequency for information which is to be recorded on the first magnetic recording region, and which generates a second recording signal having a second frequency which is lower than the first frequency for information which is to be recorded on the second magnetic recording region; and a recording device which, in synchronization with the feeding of the film, records information using the first recording signal on the first magnetic recording region, and records information using the second recording signal on the second magnetic recording region.

20 Claims, 7 Drawing Sheets

CAMERA CAPABLE OF MAGNETIC RECORDING

This is a Continuation of application Ser. No. 08/214,632 filed Mar. 18, 1994, now abandoned.

BACKGROUND OF THE INVENTION

1. Field of the Invention

The present invention relates to a camera having a magnetic recording device capable of recording photographic information on a magnetic recording region provided on the film.

2. Description of the Related Art

For instance, in U.S. Pat. No. 5,006,873, a film is disclosed which is provided with magnetic recording regions in a plurality of tracks corresponding to the various frames on the film.

In U.S. Pat. No. 5,229,810, there is disclosed a camera which is capable of using a film as disclosed in U.S. Pat. No. 5,006,873. This camera is able to record information (hereinafter generally termed photographic information) such as for example the date of shooting each frame and/or the exposure values (stop number and shutter time) magnetically on the magnetic recording region of the film, simultaneously with winding on the film. This photographic information recorded on the film is read out by the developing laboratory when the film is being developed, and for example is overprinted upon the film in character form relating to the read out photographic information.

Further, in U.S. Pat. No. 4,832,275 for example, there is disclosed a film cartridge with which the film can be forwarded out from the cartridge and can be wound back into the cartridge by a film spool in the cartridge being rotated respectively in a forward or a backward rotational direction. If this type of cartridge is used, it is possible to shoot the frames on a film in the cartridge which has been loaded into the camera up to a certain intermediate frame, then temporarily to remove the film cartridge from the camera with the later frames after the intermediate frame remaining as non-exposed, and thereafter to load the film cartridge back into the camera again for shooting the later frames.

For instance, in U.S. Pat. No. 4,864,332, disclosed is a camera which can reliably prevent a double exposure. This camera is constructed such that information (hereinafter termed exposure completed information) showing that each frame has been exposed is magnetically recorded on a magnetic recording region of the film corresponding to this frame by a magnetic recording and playback head while the film is being wound on to the next frame after shooting this frame, and then when the film is reloaded into the camera the information on each magnetic recording region is read out by this magnetic recording and playback head so that exposure can be permitted only for those of the frames for which the exposure completed information is not played back, i.e., for the unexposed frames.

It is desirable to use a recording signal of relatively high frequency so as to record the information in the magnetic recording region in as high a density as possible, in order to record as large a quantity of photographic information as possible, for example, in order to record character information input by the camera user as well as the date and/or the time of shooting and the exposure values. However, if such a recording signal of relatively high frequency is used not only for recording the photographic information but also for recording the exposure completed information, the following problems tend to arise.

This type of exposure completed information is played back by the playback device housed in the camera when the film cartridge accommodating a partially used file is reloaded into the camera. The magnetic recording and playback head provided in the camera is subject to inclination of the recording portion (head gap) thereof with respect to the direction of forwarding of the film due to manufacturing variations, and furthermore the angle of this inclination (azimuth angle) is not guaranteed to be constant for each camera.

If the unexposed frames of the partially used cartridge are exposed with the same camera by which the film has been partially exposed, no great problem arises with regard to ensuring compatibility of the azimuth angle. However, in the case that various frames are exposed and the recordation of information and playback of information are performed by the different cameras, the problem due to the azimuth angles occurs.

Relative deviation may occur between the direction in which the signal has been recorded on the magnetic recording region and the direction of inclination of the recording portion, and so called azimuth loss can occur if the deviation of the azimuth angle is large, so that it may happen that the exposure completed information cannot be read back accurately. In other words with a high frequency recording signal it may undesirably occur that while reading back one portion of the recorded signal a neighboring portion thereof is picked up because the interval between mutually neighboring recorded signal portions is reduced, and for this reason there is a chance that the exposure completed information cannot be properly read back.

SUMMARY OF THE INVENTION

The objective of the present invention is to provide a camera equipped with a magnetic recording apparatus which is capable of recording a relatively large amount of information, such as for example photographic information, for which the probability is low that it will be read back by a camera, and which moreover can keep the influence due to azimuth loss as low as possible when reading back information, such as exposure completed information, for which the probability is high that it will be read back by a camera.

In order to attain this objective, the present invention proposes a camera magnetically recording information on a first magnetic recording region and a second magnetic recording region provided on the film, comprising: a signal generating circuit which generates a first recording signal having a first frequency for information which is to be recorded on the first magnetic recording region, and which generates a second recording signal having a second frequency which is lower than the first frequency for information which is to be recorded on the second magnetic recording region; and a recording device which, in synchronization with the feeding of the film, records information using the first recording signal on the first magnetic recording region, and records information using the second recording signal on the second magnetic recording region.

The first recording signal having the first frequency records information on the first magnetic recording region of the film, and the second recording signal having the second frequency records information on the second magnetic recording region of the film. Accordingly it becomes possible to record a relatively large amount of information on the first magnetic recording region and when reading back the information on the second magnetic recording region the influence due to azimuth loss is kept as low as possible.

If information for which the probability of its being played back by the camera is low, such as for example photographic information, is recorded in the first magnetic recording region, and information for which the probability of its being played back by the camera is high, such as for example exposure completed information, is recorded in the second magnetic recording region, then, it is possible to ensure that the influence due to azimuth loss is kept as low as possible in accompaniment with no deterioration of the amount which can be recorded as a whole.

DETAILED DESCRIPTION OF THE EMBODIMENTS

First Embodiment

The first embodiment of the present invention will now be explained with reference to FIGS. 1 through 6.

Figure 1:
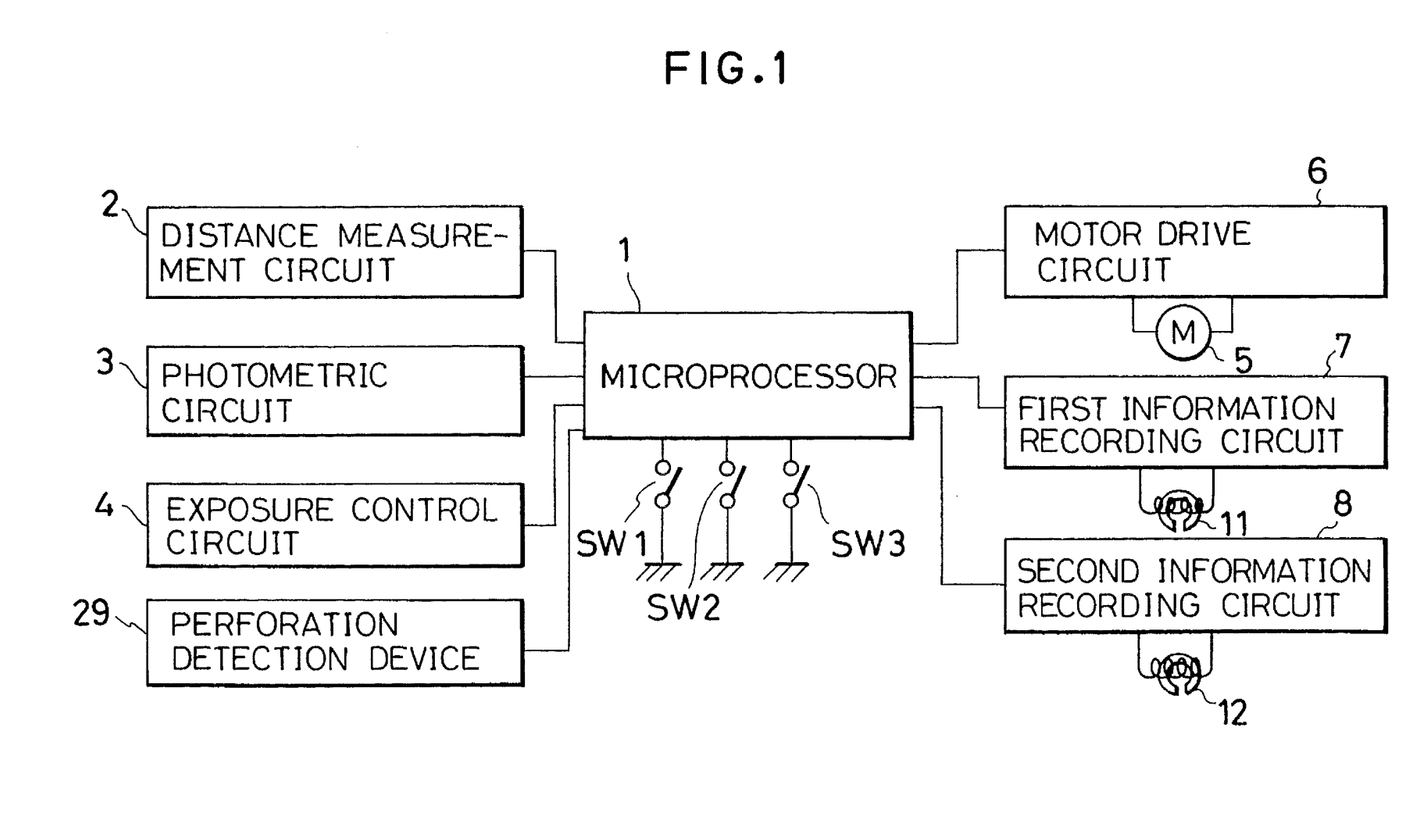
FIG. 1 is a block diagram of the control system of a camera according to the first embodiment of the present invention.

FIG. 1 is a block diagram of the control system of a camera according to the first embodiment of the present invention. Referring to this figure, the reference numeral 1 denotes a microprocessor which performs overall sequence control for the camera, and which comprises a central processing circuit, a memory circuit, input and output circuits, a clock pulse generating circuit, and other per se conventional circuitry. To this microprocessor 1 there are connected a distance measurement circuit 2 which detects the distance to the object, a photometric circuit 3 which detects the brightness of the object, an exposure control circuit 4 which executes operations for performing photography such as driving an diaphragm and a shutter neither of which is shown in the figures, a perforation detection device 29 which will be described in detail hereinafter and which detects when a perforation in the film passes it, a motor drive circuit 6 which drives a film feeding motor 5, a first information recording circuit 7, and a second information recording circuit 8.

Figure 3:
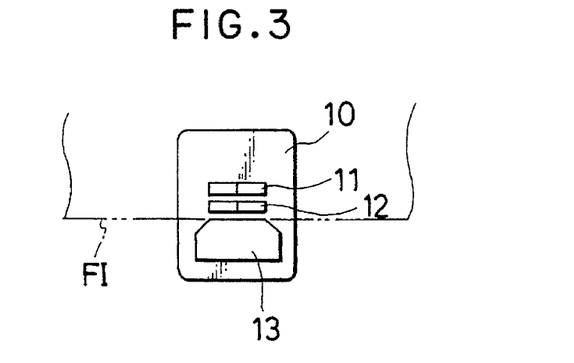
FIG. 3 is a figure showing the construction of the magnetic recording head incorporated in the camera of FIGS. 1 and 2.
Figure 4:
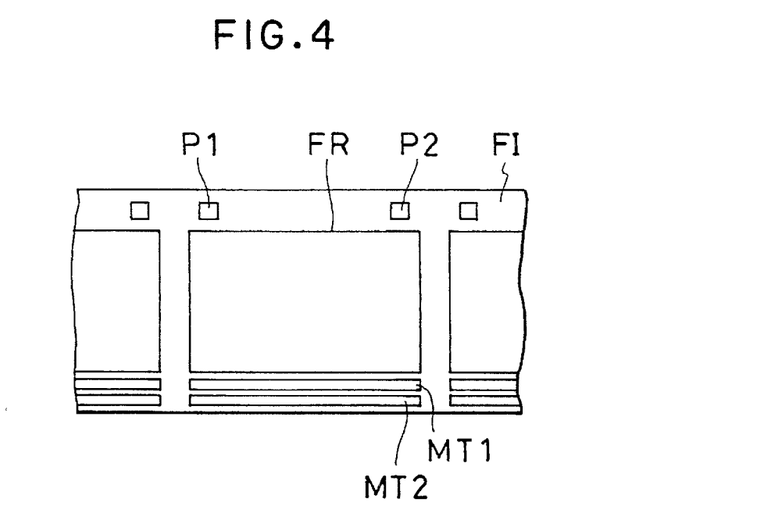
FIG. 4 is a view showing a film used in the camera of the first embodiment.

Connected to the first and second information recording circuits 7 and 8 are coils of first and second recording portions 11 and 12 of a magnetic head 10 as shown in FIG. 3. Information is recorded by these two recording portions 11 and 12 on magnetic tracks or magnetic recording regions which are provided on the film FI. As shown in FIG. 4, along the edge of the film FI which is intended for use with the camera of this first embodiment there are provided a pair of upper and lower magnetic recording tracks MT1 and MT2 for each of the frames on the film FI. The first recording portion 11 writes photographic information of the type described previously on the upper magnetic recording track MT1, while the second recording portion 12 writes information including exposure completed information of the type described previously on the lower magnetic recording track MT2. Although the first recording portion 11 is used only for magnetic recording and not for playback, the second recording portion 12 is also capable of reading out exposure completed information and the like which is recorded on the lower magnetic recording track MT2.

A projecting portion 13 is provided in the magnetic head 10 below the recording portions 11 and 12 for position stabilization in the vertical direction. By the operation of this projecting portion 13 the position of the film FI with respect to the magnetic head 10 is stabilized, so that the first and second recording portions 11 and 12 are kept accurately in contact with the upper and lower magnetic recording tracks MT1 and MT2, respectively. Referring to FIG. 4, P1 and P2 denote two perforations pierced for each frame of the film FI.

Figure 5A:
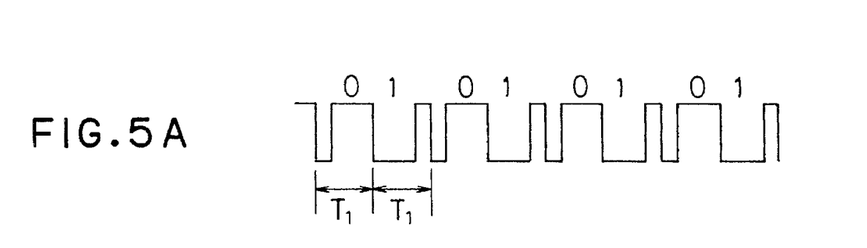
FIGS. 5A and 5B are waveform diagrams showing an example of the signals which may be recorded on two magnetic tracks of the film.
Figure 5B:
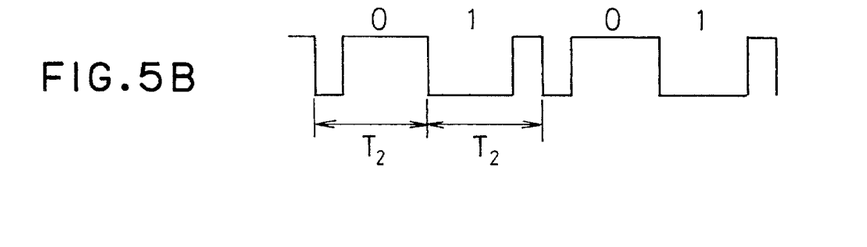

FIGS. 5A and 5B are waveform diagrams showing the recording signals produced by the first and second information recording circuits 7 and 8, respectively. These signals are of the pulse position modulation method or the self clocking method. A "0" is encoded by the trailing edge of the signal dropping in the first half of the interval (shown as T1 or T2) between the previous trailing edge of the signal and the next trailing edge thereof, while a "1" is encoded by the trailing edge of the signal dropping in the second half of the interval. As will be understood from FIGS. 5A and 5B, the period T1 of the recording signal of FIG. 5A produced by the first information recording circuit 7 is set to be half of the period T2 of the recording signal of FIG. 5B produced by the second information recording circuit 8, so that correspondingly the frequency of the recording signal of FIG. 5A is set to be twice the frequency of the recording signal of FIG. 5B. The first and second information recording circuits 7 and 8, based upon the photographic information and the exposure completed information and the like set by the microprocessor 1, respectively generate the relatively high frequency signal shown in FIG. 5A and the relatively low frequency signal shown in FIG. 5B, and output these signals to the first and second recording portions 11 and 12 respectively.

Returning to the description of FIG. 1, to the microprocessor 1 there are connected a first stroke switch SW1 which is turned ON by the partial depression of a shutter release button not particularly shown in the figures, a second stroke switch SW2 which is turned ON by the full depression of the shutter release button, and an intermediate rewind switch or an intermediate unloading switch SW3 for manually instigating rewinding of the film FI before shooting of all the frames which are available on the film FI has been completed. This intermediate rewind switch SW3 may be turned ON, for example, when a intermediate rewind button (not particularly shown in the figures) provided on the body of the camera is pressed.

Figure 2:
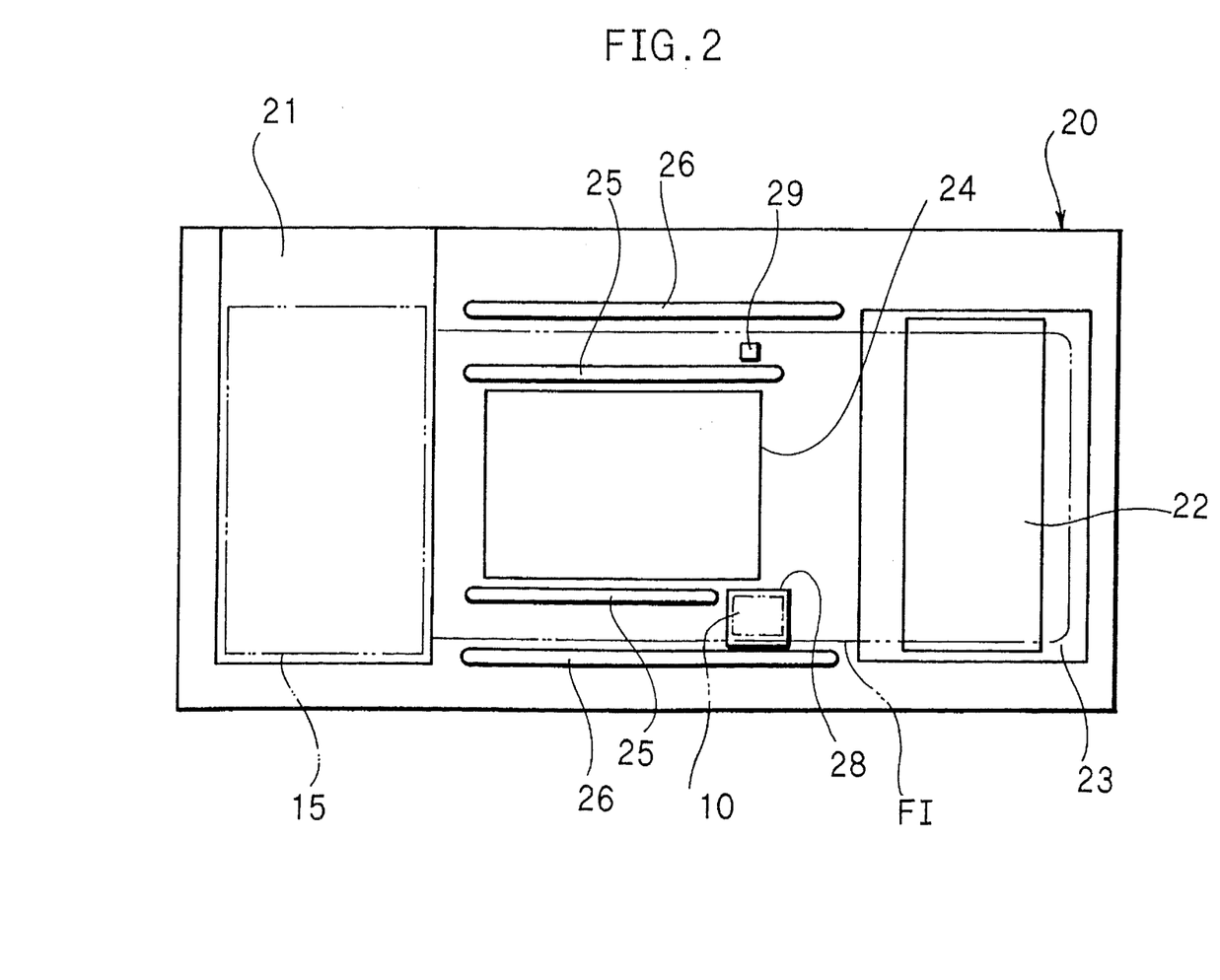
FIG. 2 is a schematic rear view of this first embodiment camera, shown with its rear lid removed.

FIG. 2 is a schematic rear view of this first embodiment camera, denoted as 20 and shown with its rear lid removed.

At one end of the body of the camera 20 there is provided a cartridge chamber 21 in which a film cartridge 15 is loaded, and at the other end of the body of the camera 20 there is provided a spool chamber 23 in which a film take up spool 22 is mounted so as to be rotatable. Between these chambers 21 and 22 an aperture 24 is formed as an opening for exposure. An inner rail 25 and an outer rail 26 are provided above and below the aperture 24, respectively, for defining a film transfer path.

The film cartridge 15 in the first embodiment may for example be of the type disclosed in U.S. Pat. No. 4,832,275. With this film cartridge 15, when a film spool (not particularly shown) housed therein on which the film FI is coiled is rotated in a rotational direction to forward the film, the end of the film FI is projected out from the film cartridge 15. On the other hand, when the film spool is rotated in a rotational direction to rewind film, the film FI is wound back into the film cartridge 15.

A spool drive member not particularly shown in the figures is provided within the cartridge chamber 21 so as to engage with the abovementioned film spool within the film cartridge 15 to rotate the film spool. The spool drive member is connected to the film feeding motor 5 (FIG. 1) via a speed reducing gear train also not particularly shown in the figures. Thus when the film feeding motor 5 is rotated in a forward rotational direction the film FI is forwarded out from the film cartridge 15, while on the other hand when the film feeding motor 5 is rotated in a backward rotational direction the film FI is rewound back into the film cartridge 15. Further, the film take up spool 22 is also connected to the film feeding motor 5 via a speed reducing gear train also not particularly shown in the figures and can be rotated. And, when by the rotation of the film feeding motor 5 in its forward rotational direction the film FI is forwarded out from the film cartridge 15 so far as to reach the film take up spool 22, the film FI is pressed by a film roller not particularly shown in the figures against the film take up spool 22 so as to be caught up by the film take up spool 22, and thereafter is wound up thereon.

Referring to FIG. 2, a perforation detection device 29 is disposed at a rightward position above the aperture 24, in order to detect perforations in the film FI. The perforation detection device 29 may, for example, consist of a per se known type of photoreflector or photointerruptor. Alternatively, it would also be acceptable to employ a type of perforation detection ON-OFF switch which operated by mechanically contacting the portion of the film FI in which perforations occurred. The perforation detection device 29 is provided in a position such that, when any one of the frames FR (refer to FIG. 4) of the film FI is positioned against the aperture 24, the perforation detection device 29 confronts the perforation P1 corresponding to the frame FR, so as to detect the perforation P1.

Further, the previously described magnetic head 10 is disposed at a rightward position below the aperture 24, and a pressure pad 28 is provided on the other side of the film FI from the magnetic head 10, so as to press the film FI against the magnetic head 10. After a frame FR which was positioned against the aperture 24 has been shot the film FI travels from the film cartridge 15 to the take up spool 22 so that the film FI is being wound on by one frame. The magnetic head 10 is disposed such that during the film winding on process, it is possible to magnetically record information relating to the photographic condition of the frame FR which has just been shot (which was positioned against aperture 24) upon the upper and lower magnetic recording tracks MT1 and MT2 which are positioned directly under the frame FR.

Next, referring to the flow chart shown in FIG. 6, the procedure followed by the microprocessor 1 for performing photography and for controlling magnetic recording will be explained.

Figure 6:
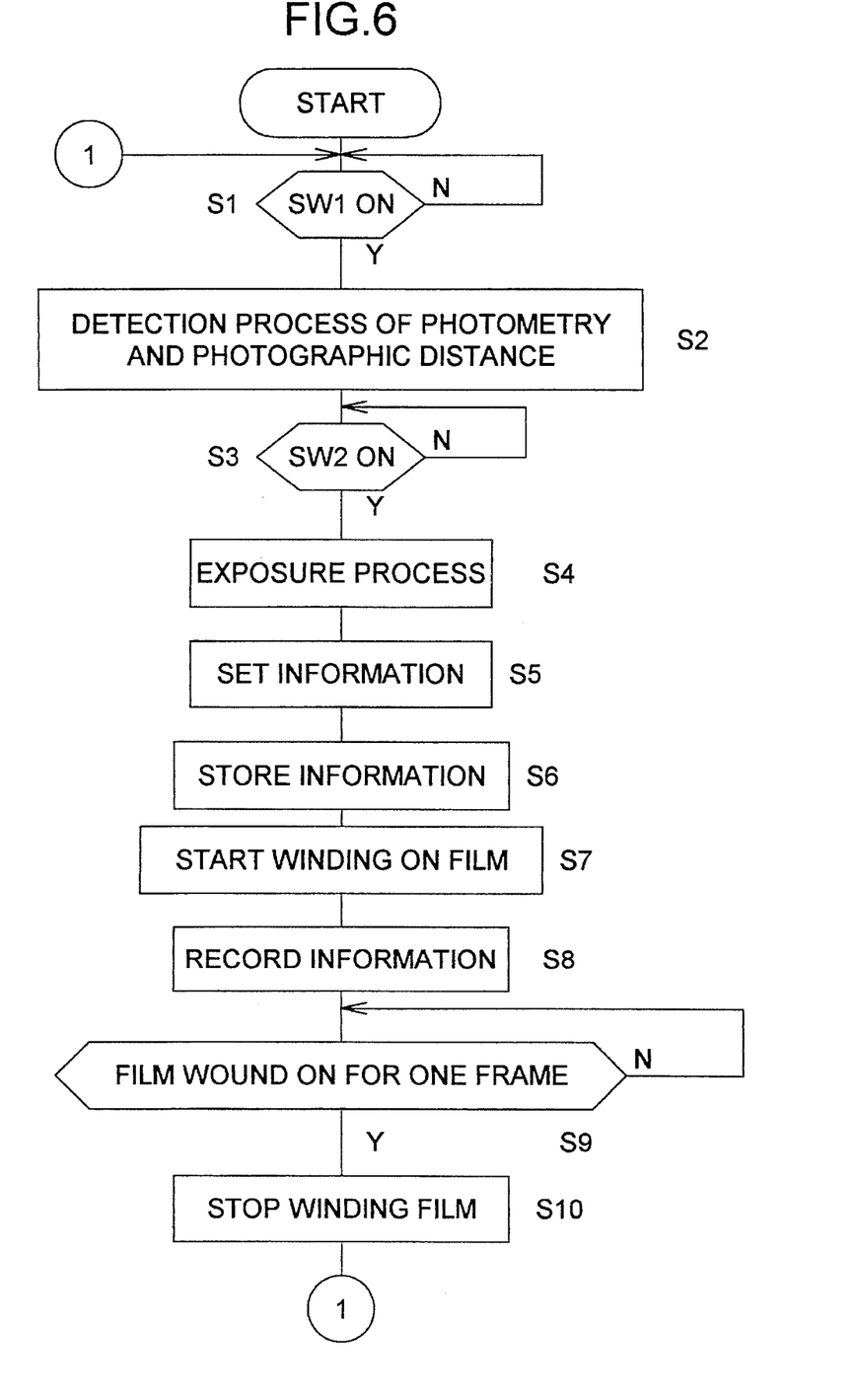
FIG. 6 is a flow chart for explanation of the operation of this first embodiment of the present invention.

The microprocessor 1 starts to execute the program whose flow chart is shown in FIG. 6 when a power switch (not particularly shown in the figures) of the camera 20 is turned ON. First, in step S1, the system waits until the first stroke switch SW1 comes to be closed by the shutter release button being partially depressed. When the first stroke switch SW1 is turned ON and the flow of control proceeds to step S2 in which photometry is performed and the distance to the object (referred to as the photographic distance) is calculated. In other words, the brightness of the object as determined by the photometric circuit 2 is input to the microprocessor 1, and the photographic distance as determined by the distance measurement circuit 3 is also input to the microprocessor 1. In step S3, the system waits until the second stroke switch SW2 comes to be closed by the shutter release button being fully depressed. When the second stroke switch SW2 is turned ON and the flow of control proceeds to step S4 in which the exposure control circuit 4 is operated and the diaphragm and the shutter are driven so as to perform photography. At the time, the exposure values for photography, i.e. the stop number and the shutter time, are determined based upon the brightness of the object which was determined and upon the film sensitivity in step S2. The position of the focussing lens of the photographic lens is determined based upon the photographic distance which was determined in step S2.

In step S5, the date and/or time of photography input from a per se conventional type of date/time setting device and the exposure values are set as the information which is to be recorded on the first or upper magnetic recording track MT1, and the exposure completed information is set as the information which is to be recorded on the second or lower magnetic recording track MT2. Although the method by which the information is set may be any suitable method, it is considered that, for example, the method disclosed in U.S. Pat. No. 5,006,873 is suitable. In step S6 the various items of information set in step S5 are stored in a memory not particularly shown in the figures, and then in step S7 the microprocessor 1, via the motor drive circuit 6, starts the film feeding motor 5 operating in its forward rotational direction, so as to commence winding on the film FI.

In step S8, magnetic recording on the film FI is performed simultaneously with winding it on. In concrete terms, the stored photometric information is output to the first information recording circuit 7 and the exposure completed information is output to the second information recording circuit 8. The first information recording circuit 7 generates the high frequency (first frequency) self clocking signal as shown in FIG. 5A for recording on the upper magnetic recording track MT1 the photographic information which has been input, and outputs the high frequency signal to the first recording portion 11. The second information recording circuit 8 generates the low frequency (second frequency) self clocking signal as shown in FIG. 5B for recording on the lower magnetic recording track MT2 the exposure completed information which has been input, and outputs the low frequency signal to the second recording portion 12. Along with the movement of the film FI, the first and the second recording portions 11 and 12 respectively record the photographic information and the exposure completed information using the high frequency signal generated by the first information recording circuit 7 and using the low frequency signal generated by the second information recording circuit 8 on the upper magnetic recording track MT1 and on the lower magnetic recording track MT2, respectively.

After this, in step S9, the system waits until it is determined, according to the signal from the perforation detection device 29, that the film FI has been wound on by its one frame; and, when one frame film wounding on operation is completed in step S10 the film feeding motor 5 is stopped. And then the flow of control returns to step S1.

With the camera according to the first embodiment of the present invention, simultaneously with the film FI being wound on through one frame, photographic information is recorded on the upper magnetic recording track MT1 on the film FI, and also exposure completed information is recorded on the lower magnetic recording track MT2. Since the photographic information is recorded using the high frequency recording signal, a relatively high amount of information can be recorded on the upper magnetic recording track MT1. Further, since as described previously the photographic information recorded on the upper magnetic recording track MT1 is used in the development laboratory or the like in order to transmit the conditions of photography. Therefore, probability of its being played back by a magnetic head fitted in a camera is low, so that no problem arises due to the azimuth angle even if the recording signal is of a high frequency.

On the other hand, since the exposure completed information is recorded using the low frequency recording signal, the interval between mutually neighboring signals is relatively wide, so that it is possible to keep the influence due to azimuth loss at its lowest possible level when the exposure completed information is being played back. Moreover, although the amount of information which can be recorded using such a relatively low frequency recording signal is relatively small, no problem tends actually to arise, since the amount of information to be recorded on the lower magnetic recording track MT2 is quite low, because, in contrast with the photographic information, the exposure completed information in practice does not contain numerical values or characters.

Second Embodiment

The second embodiment of the present invention will now be explained with reference to the flow chart shown in FIG. 7.

In the second embodiment, just as in the first embodiment described above, photographic information is recorded by the first recording portion 11 on the upper magnetic recording track MT1 on the film FI using a high frequency recording signal during the winding on process to the next frame after each frame has been shot. However it is not similarly the case, in the second embodiment, that exposure completed information is recorded by the second recording portion 12 on the lower magnetic recording track MT2 while the film is being wound on to the next frame. On the contrary, when the cartridge intermediate unloading instruction is issued, instead of such exposure completed information, non-exposed frame information relating to the frames of the film which have not been shot is recorded. The non-exposed frame information is information that shows that certain frames on the film have not been shot, and the non-exposed frame information is played back by the magnetic head within the camera, when the cartridge accommodating of a film which has only been exposed up to a certain intermediate point thereof is been taken out of the camera and is subsequently again loaded into the camera. Further, if only the frame or frames for which the non-exposed frame information have been played back is permitted to be exposed, it is possible reliably to ensure that double exposure of any frame is prohibited.

Figure 7:
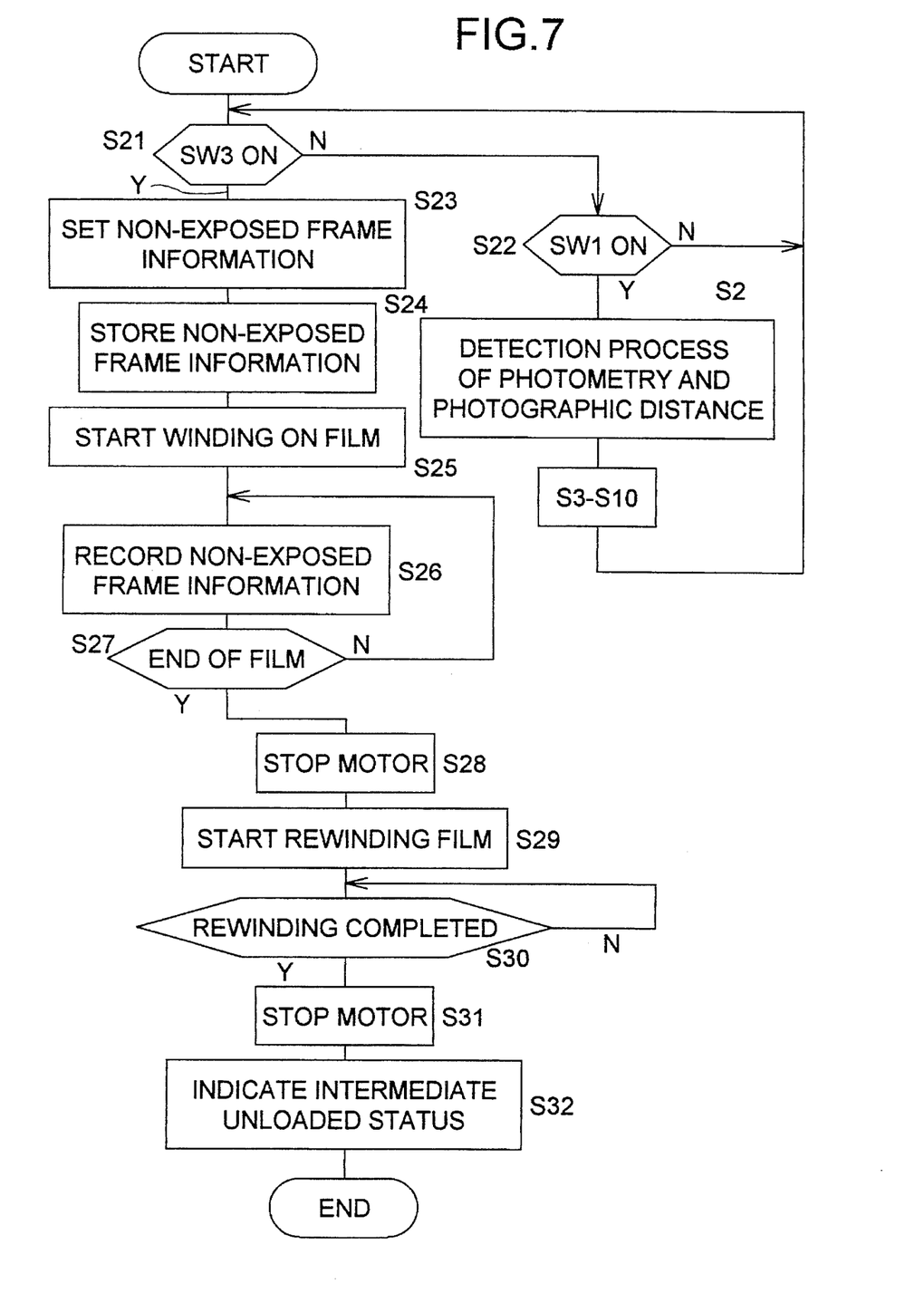
FIG. 7 is a flow chart for explanation of the operation of a second embodiment of the present invention.

FIG. 7 is a flow chart showing the procedure when the cartridge accommodating a film a part of which has been shot is unloaded. In the following explanation, steps which correspond to steps in the FIG. 6 and which perform identical operations are denoted by the same reference numerals, and their description will be abbreviated. Referring to FIG. 7, first in step S21 the microprocessor 1 checks whether or not the intermediate rewind switch SW3 is ON. If the result of the test is NO so that the intermediate rewind switch SW3 is OFF, then the flow of control is transferred to step S22, in which a check is made as to whether or not the first stroke switch SW1 is ON. If the result of the test is NO so that the first stroke switch SW1 is OFF, then the flow of control loops back to step S21. If it is checked that the first stroke switch SW1 is ON, then the flow of control is transferred to a sequence of steps identical to the steps S3 through S10 of the FIG. 6 flow chart, with the modification that in the steps S5, S6, and S8 only the first information recording circuit 7 and the first recording portion 11 are operated, so that when the film is being wound on only the photographic information is recorded, while no such information as exposure completed information is recorded.

On the other hand, if in step S21 it is checked that the intermediate rewind switch SW3 is ON, then the flow of control is transferred to the step S23, in which the non-exposed frame information is set as the information which is to be recorded on the lower magnetic recording track MT2. And in step S24 the non-exposed frame information thus set is stored in a memory, and then in step S25 the microprocessor 1 starts the film feeding motor 5 operating in its forward rotational direction, so as to commence winding on the film FI.

In step S26 the non-exposed frame information which has thus been stored in the memory is read out and is output to the second information recording circuit 8, in order to record the non-exposed frame information on the film FI. The second information recording circuit 8 generates a low frequency self clocking signal in order to record on the lower magnetic recording track MT2 the non-exposed frame information which has been input, and outputs the low frequency signal to the second recording portion 12. Along with the movement of the film FI, the second recording portion 12 records the non-exposed frame information using the low frequency signal generated by the second information recording circuit 8 on the lower magnetic recording track MT2.

In step S27 a decision is made, based upon the output from the perforation detection device 29, as to whether or not the film FI has been wound on as far as its end. If the result of the decision is NO then the flow of control returns back to step S26 to record the non-exposed frame information on the film FI, while when the result of the decision becomes YES the flow of control passes on to step S28.

In step S28, the operation of the film feeding motor 5 is stopped, and then in step S29 the film feeding motor 5 is operated in its backward rotational direction, so as to start rewinding the film FI. In step S30, a decision is made, based upon the output from the perforation detection device 29, as to whether or not the film FI has been completely rewound as far as its beginning, and the flow of control waits until the film FI is thus completely rewound. When the result of the decision becomes YES the flow of control passes on to step S31. In the step S31 the operation of the film feeding motor 5 is stopped, and then in step S32 an indicator for film-use status provided upon the film cartridge which shows the state of use of the film is driven so as to display an indication of the cartridge accommodating a film a part of which has been shot. Then the operation of the microprocessor 1 following the flow chart terminates.

Since the exact nature of the indication for film-use status is not directly related to the concept of the present invention, it will not be described in detail in the specification. However, the indicator may for example be of the type disclosed in U.S. patent application Ser. No. 730,070.

According to the second embodiment of the present invention as described above, in the same way as with the first embodiment, simultaneously with the winding on (forwarding) of the film FI by one frame, the photographic information is recorded with a relatively high frequency signal on the upper magnetic recording track MT1 of the film FI. therefore, a relatively large amount of information can be stored. On the other hand, when a command is issued for the film cartridge to be unloaded from the camera at an intermediate stage after only a part of the film FI has been shot, the film is temporarily wound on to its end while the non-exposed frame information is recorded on the lower magnetic recording track MT2. Because the non-exposed frame information is recorded using a recording signal of relatively low frequency, the interval between mutually neighboring signals is naturally relatively wide, and it is possible to keep the influence due to azimuth loss at its lowest possible level when playing back the non-exposed frame information.

Third Embodiment

The third embodiment of the present invention will now be explained with reference to the flow chart shown in FIG. 8.

In the third embodiment, in principle, both exposure completed information and photographic information are recorded on the lower magnetic recording track MT2, and only that portion of the photographic information which exceeds the recording capability of the lower magnetic recording track MT2 is recorded on the upper magnetic recording track MT1. Moreover, in the third embodiment, it is supposed that the amount of the exposure completed information which is to be recorded is determined in advance. On the other hand, because the photographic information may optionally include information which is input by the camera user and the amount of which is not determined in advance, the amount of such photographic information which is to be recorded is not limited to being a constant or predetermined amount.

Figure 8:
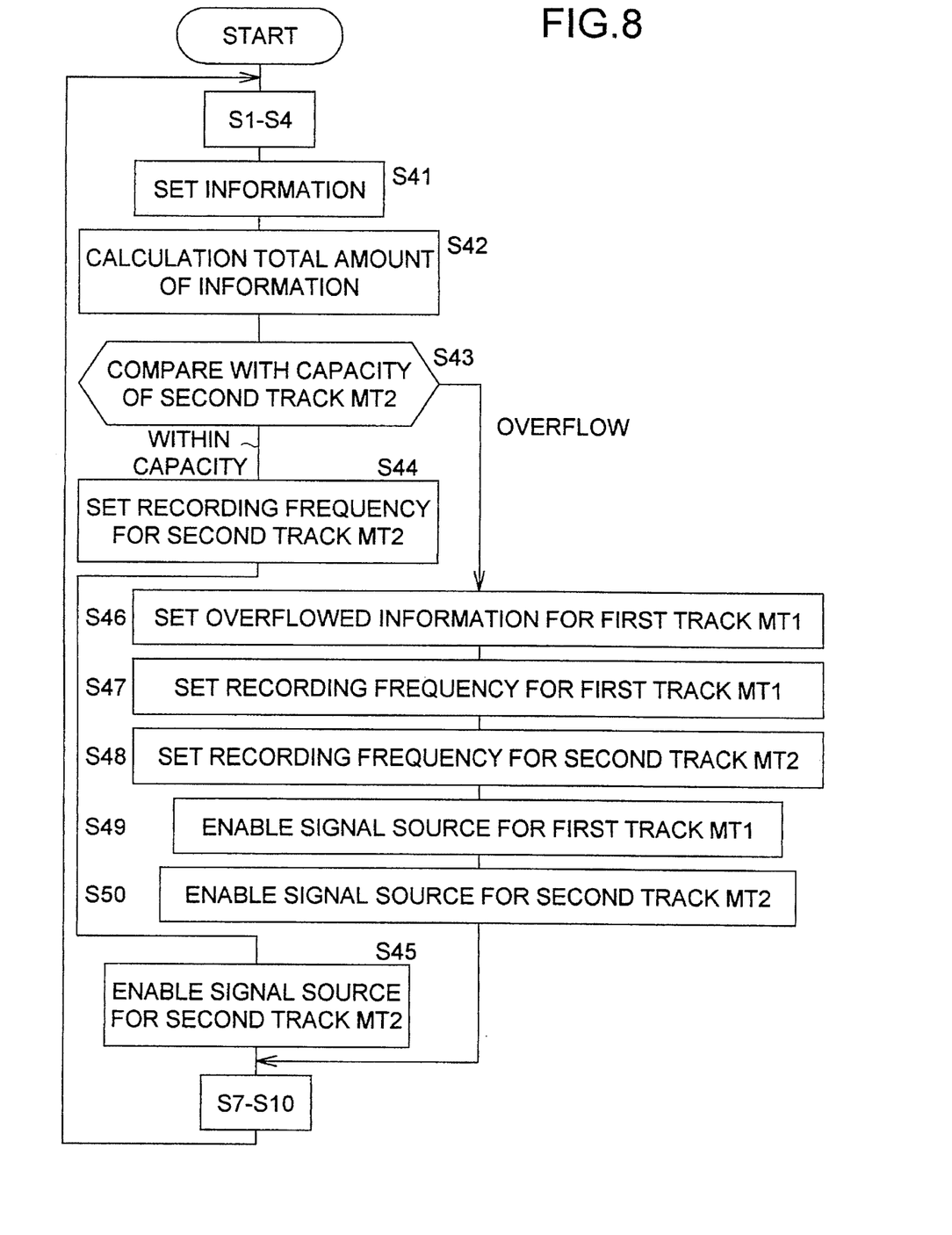
FIG. 8 is a flow chart for explanation of the operation of a third embodiment of the present invention.

Referring to FIG. 8, first processing identical to that performed in steps S1 through S4 shown in FIG. 6 is performed, and then in step S41 the date/time of photography and/or the photographic information indicating the exposure values and the exposure completed information are set as the information which is to be recorded. In step S42 the total amount of information to be recorded, which is the sum of the amount of the photographic information and the exposure completed information, is determined. In step S43, the total amount of information thus determined in step 42 is compared with the total information capacity of the lower magnetic recording track MT2 so that it is determined as to whether both of the photographic information and the exposure completed information can be recorded on the lower magnetic recording track MT2. It should be noted that the total information capacity of the lower magnetic recording track MT2 is to be understood as being the recording capacity thereof when the information is recorded magnetically using a recording signal of the above described relatively low frequency (i.e., of the second recording frequency).

If it is determined in step S43 that both the photographic information and the exposure completed information can be completely recorded within the space available on the lower magnetic recording track MT2, then the flow of control proceeds to step S44, in which the frequency of the recording signal is set to the second relatively low recording frequency. Then in step S45 a signal source for the second track, included within the microprocessor 1, is put into the enabled state, so that information recording on the lower magnetic recording track MT2 is permitted. After this, the flow of control passes to a sequence of steps identical to the steps S7 through S10 of the FIG. 6 flow chart, so that simultaneously with the winding on of the film the action is performed of recording the information on the magnetic track. At the time only the second information recording circuit 8 is operated, while the first information recording circuit 7 is not operated. By doing the, both the photographic information and the exposure completed information are recorded on the lower magnetic recording track MT2 using a recording signal of the second recording frequency, which is a relatively low frequency.

On the other hand, if it is determined in step S43 that the total amount of the photographic information and the exposure completed information exceeds the total recording capacity of the second magnetic track MT2 for relatively low frequency, i.e., information to be recorded overflows, then the flow of control proceeds to the step S46. In step S46 the portion of the photographic information overflowed is set so as to be recorded on the upper magnetic recording track MT1, and in steps S47 and S48 the frequencies for the recording signals are set to the first relatively high recording frequency and to the second relatively low recording frequency. In steps S49 and S50 signal sources, included within the microprocessor 1, for the upper magnetic recording track MT1 and for the lower magnetic recording track MT2 are both put into the enabled state, so that information recording is permitted both on the upper magnetic recording track MT1 and on the lower magnetic recording track MT2. After this the flow of control again passes to the sequence of steps identical to the steps S7 through S10 of the FIG. 6 flow chart. At the time both the second information recording circuit 8 and the first information recording circuit 7 are operated. By doing the, the exposure completed information and a portion of the photographic information are recorded on the lower magnetic recording track MT2 using a recording signal of the second recording frequency, which is a relatively low frequency, while the remainder of the photographic information is recorded on the upper magnetic recording track MT1 using a recording signal of the first recording frequency, which is a relatively high frequency.

In the manner, in the case that both the photographic information and the exposure completed information can be completely recorded together on the lower magnetic recording track MT2, only the second information recording circuit 8 needs to be operated for recording upon lower magnetic recording track MT2 and it is not necessary to operate the first information recording circuit 7, and accordingly an economy of electrical power can be realized.

Fourth Embodiment

The fourth embodiment of the present invention will now be explained with reference to the flow chart shown in FIG. 9.

In the fourth embodiment, the non-exposed frame information is recorded on the lower magnetic recording track MT2 during operation of intermediately unloading the cartridge in the same manner as with the second embodiment described above, and in principle also the photographic information is recorded on the lower magnetic recording track MT2. Further, that portion of the photographic information which exceeds the recording capacity of the lower magnetic recording track MT2 is recorded on the upper magnetic recording track MT1.

Figure 9:
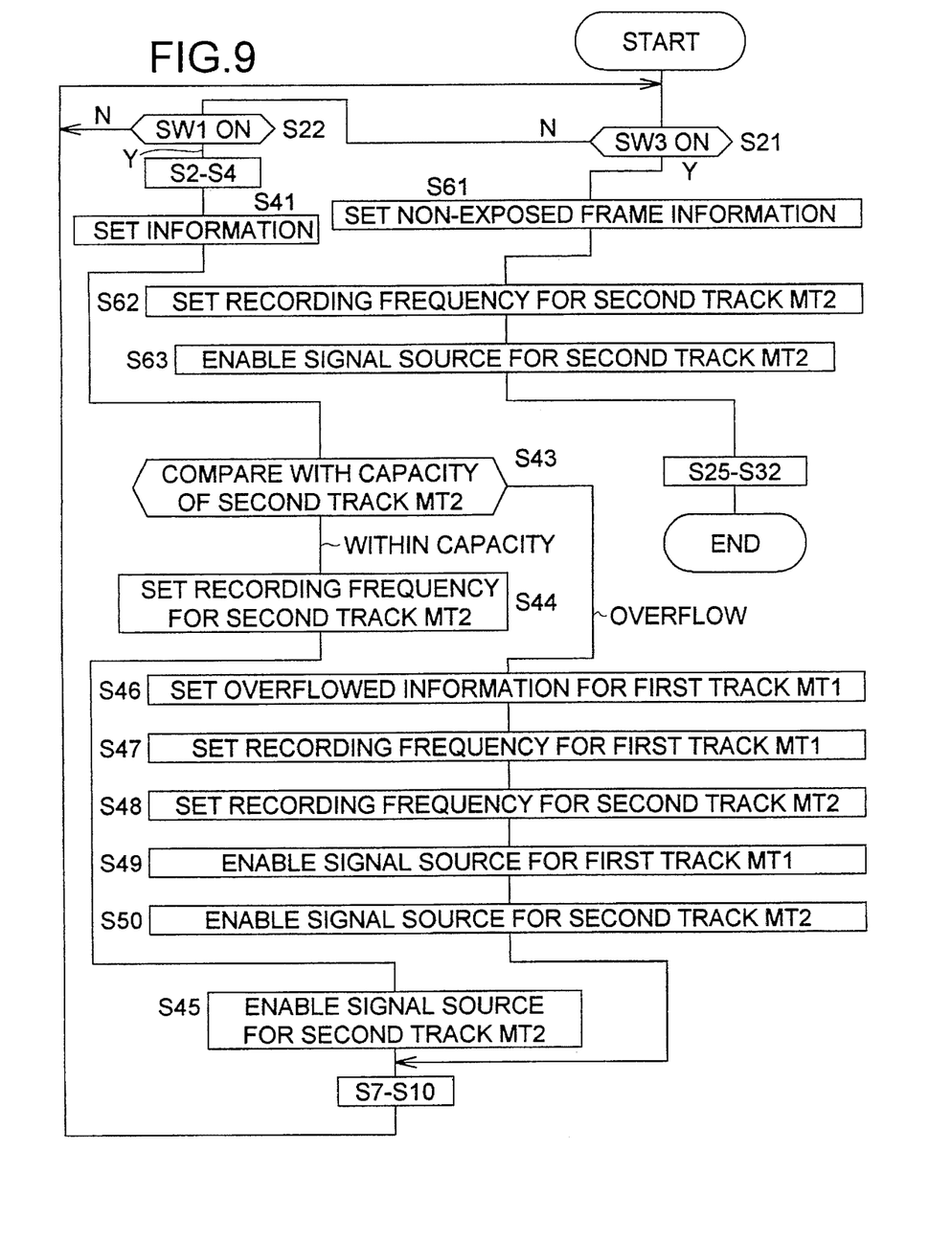
FIG. 9 is a flow chart for explanation of the operation of a fourth embodiment of the present invention.

Referring to FIG. 9, if in the midst of executing the loop including steps S21 and S22 of FIG. 7 a decision is made that the first stroke switch SW1 is ON, processing identical to that performed in the steps S2 through S4 of FIG. 6 is performed. Then, after processing is performed identical to that performed in steps S41 and S43 through S50 of FIG. 8, processing is performed identical to that performed in steps S7 through S10 of FIG. 6. However, the only information recorded in the loop is the photographic information.

On the other hand when in step S21 a decision is made that the intermediate rewind switch SW3 is ON the flow of control passes to step S61, in which the non-exposed frame information which is to be recorded is set. In step S62, the second relatively low recording frequency is set as the frequency of the recording signal. In step S63 a signal source for the second track, included within the microprocessor 1, is put into the enabled state, so that information recording on the lower magnetic recording track MT2 is permitted. After this the flow of control passes to a sequence of steps identical to steps S25 through S32 of the FIG. 7 flow chart. By doing the, the non-exposed frame information is recorded on the lower magnetic recording track MT2 using a recording signal of the second relatively low recording frequency.

Incidentally, because only the photographic information is set in step S41, no sum operation of information as stated in step S42 is necessitated.

Although in the above description of the second and fourth embodiments the case was shown, as an example, in which the non-exposed frame information was recorded for all of the frames which had not been exposed, it is in fact only necessary, as a minimum, to record the non-exposed frame information on the leading unused frame along the direction of forwarding of the film. Further, although in each of the embodiments it was shown that the recording on the upper magnetic recording track MT1 was performed with a recording signal of relatively high frequency while the recording on the lower magnetic recording track MT2 was performed with a recording signal of relatively low frequency, the opposite arrangement would be equally acceptable. Further, the recording signal need not be of the self clocking type, any of various other recording formats could be employed. Yet further, although the shown exemplary construction utilized a single magnetic head which was provided with two recording portions, it would also be acceptable to perform the magnetic recording using two magnetic heads each of which was provided with a single recording portion. In particular, with the second embodiment, since the magnetic recording using the upper magnetic recording track MT1 and the magnetic recording using the lower magnetic recording track MT2 are performed at different times, it would also be acceptable to perform both these recording processes by using only one magnetic head which was provided with a single recording portion, by appropriately raising and lowering the single magnetic head as required. Accordingly, although the present invention has been shown and described in terms of several embodiments thereof, it is not to be considered as limited by any of the perhaps quite fortuitous details of the embodiments or of the drawings, but only by the terms of the appended claims, which follow.

We claim:

1. A camera capable of magnetically recording information on a first magnetic recording region and a second magnetic recording region provided on a film, comprising:

a signal generating circuit which generates a first recording signal having a first frequency for information including at least data and clock information which is to be recorded on said first magnetic recording region, and which generates a second recording signal having a second frequency which is lower than said first frequency for information including at least data and clock information which is to be recorded on said second magnetic recording region; and a recording device which, in synchronization with the feeding of the film, records information using said first recording signal on said first magnetic recording region, and records information using said second recording signal on said second magnetic recording region.

2. A camera according to claim 1, wherein said recording device comprises a first recording portion which magnetically records information using said first recording signal on said first magnetic recording region, and a second recording portion which magnetically records information using said second recording signal on said second magnetic recording region.

3. A camera according to claim 2, wherein said first and second magnetic recording regions are extended in the film feeding direction below the photographic frame of the film, and said first and second recording portions are opposed to said first and second magnetic recording regions respectively when information is recorded.

4. A camera according to claim 1, wherein said information recorded on said first magnetic recording region and said second magnetic recording region includes a photographic information corresponding to each photographic frame of the film and an exposure completed information indicating that a frame has been exposed, and said signal generating circuit generates said first recording signal representing said photographic information and said second recording signal representing said exposure completed information, respectively.

5. A camera according to claim 3, wherein said information recorded on said first magnetic recording region and said second magnetic recording region includes a photographic information corresponding to each photographic frame of the film and an exposure completed information indicating that a frame has been exposed, and said signal generating circuit generates said first recording signal representing said photographic information and said second recording signal representing said exposure completed information.

6. A camera according to claim 5, further comprising a film feeding device which winds on the film by just one frame after a photographic frame on the film has been shot, and wherein said recording device, while said film feeding device is winding on the film after photography, records said photographic information with said first recording signal on said first magnetic recording region and records said exposure completed information with said second recording signal on said second magnetic recording region.

7. A camera according to claim 1, wherein said information recorded on said first magnetic recording region and said second magnetic recording region includes a photographic information corresponding to each photographic frame of the film and a non-exposed frame information indicating that a frame has not been exposed, and said signal generating circuit generates said first recording signal representing said photographic information and said second recording signal representing said exposure completed information.

8. A camera according to claim 7, further comprising:

an intermediate unloading command device which commands an intermediate unloading operation in which the film is rewound back into a cartridge before all of the frames on the film have been shot; and a film feeding device which, when said intermediate unloading command is issued, feeds out all of the film from said cartridge and thereafter rewinds the film back into said cartridge, and which, when a frame on the film is shot, feeds out the film just by one frame;

and wherein said recording device records said photographic information using said first recording signal on said first magnetic recording region while said film feeding device is winding on the film by one frame, and, when the film is fed out from said cartridge in accordance with said intermediate unloading operation, records said non-exposed frame information using said second recording signal on said second magnetic recording region.

9. A camera according to claim 8, wherein said recording device comprises a first recording portion which magnetically records information using said first recording signal on said first magnetic recording region, and a second recording portion which magnetically records information using said second recording signal on said second magnetic recording region, and wherein said recording device records said photographic information using said first recording signal on said first magnetic recording region by said first recording portion while said film feeding device is winding on the film by one frame, and, when the film is fed out from said cartridge in accordance with said intermediate unloading operation, records said non-exposed frame information on said second magnetic recording region by said second recording portion.

10. A camera capable of magnetically recording information on a first magnetic recording region and a second magnetic recording region provided on a film comprising:

a signal generating circuit which generates a first recording signal having a first frequency for information which is to be recorded on said first magnetic recording region, and which generates a second recording signal having a second frequency which is lower than said first frequency for information which is to be recorded on said second magnetic recording region; and a recording device which records information using said first recording signal on said first magnetic recording region, and records information using said second recording signal on said second magnetic recording region, judging means for outputting a divisional recording command, when the amount of information to be recorded is greater than the recording capacity for said second frequency of said second magnetic recording region, and wherein, said signal generating circuit generates, (1) when said divisional recording command is issued, said second recording signal representing information which can be recorded within a recording capacity of said second magnetic region and said first recording signal representing information which cannot be recorded on said second magnetic recording region; and (2) when no divisional recording command is issued, said second recording signal representing all of information to be recorded.

11. A camera according to claim 10, wherein said recording device comprises a first recording portion which magnetically records information using said first recording signal on said first magnetic recording region, and a second recording portion which magnetically records information using said second recording signal on said second magnetic recording region.

12. A camera according to claim 11, wherein said first and second magnetic recording regions are extended in the film feeding direction below the photographic frame of the film, and said first and second recording portions are opposed to said first and second magnetic recording regions respectively when information is recorded.

13. A camera according to claim 10, wherein said information recorded on said first magnetic recording region and said second magnetic recording region includes a photographic information corresponding to each photographic frame of the film and an exposure completed information indicating that a frame has been exposed, and wherein, (1) when no divisional recording command is issued, said photographic information is recorded using said second signal on said second magnetic recording region, and (2) when said divisional recording command is issued, a portion of said photographic information which cannot be recorded on said second magnetic recording region is recorded on said first magnetic recording region, and (3) said exposure completed information is recorded on said second magnetic region irrespective of existence or non-existence of said divisional recorded command.

14. A camera according to claim 13, further comprising a film feeding device which winds on the film by just one frame after a photographic frame on the film has been shot, and wherein, said recording device records, while said film feeding device is winding on the film after photography, (1) when no divisional recording command is issued, both said photographic information and said exposure completed information on said second magnetic recording region and (2) when said divisional recording command is issued, said exposure completed information and a portion of said photographic information on said second magnetic recording region, and the remainder of said photographic information on said first recording region.

15. A camera according to claim 10, wherein said information recorded on said first magnetic recording region and said second magnetic recording region includes a photographic information corresponding to each photographic frame of the film and a non-exposed frame information indicating that a frame has not been exposed.

16. A camera according to claim 15, further comprising:

an intermediate unloading command device which commands an intermediate unloading operation in which the film is rewound back into a cartridge before all of the frames on the film have been shot; and a film feeding device which, when said intermediate unloading command is issued, feeds out all of the film from said cartridge and thereafter rewinds the film back into said cartridge, and which, when a photographic frame on the film is shot, feeds out the film just by one frame; and wherein, said recording device records, (1) when said intermediate unloading command is issued, said unexposed frame information on said second magnetic recording region during the film being fed out from said cartridge, (2) when neither said intermediate unloading command nor said divisional recording command is issued, said photographic information on said second magnetic recording region, and (3) when no intermediate unloading command is issued and said divisional recording command is issued, a portion of said photographic information on said second magnetic recording region and the remainder of said photographic information on said first magnetic recording region.

17. A recorder capable of magnetically recording information on a first magnetic recording region and a second magnetic recording region provided on a film, comprising:

a signal generating circuit which generates a first recording signal having a first frequency for information including at least data and clock information which is to be recorded on said first magnetic recording region, and which generates a second recording signal having a second frequency which is lower than said first frequency for information including at least data and clock information which is to be recorded on said second magnetic recording region; and a recording device which, in synchronization with the feeding of the film, records information using said first recording signal on said first magnetic recording region, and records information using said second recording signal on said second magnetic recording region.

18. A recorder capable of magnetically recording information on a first magnetic recording region and a second magnetic recording region provided on a film comprising:

a signal generating circuit which generates a first recording signal having a first frequency for information which is to be recorded on said first magnetic recording region, and which generates a second recording signal having a second frequency which is lower than said first frequency for information which is to be recorded on said second magnetic recording region; and a recording device which records information using said first recording signal on said first magnetic recording region, and records information using said second recording signal on said second magnetic recording region, judging means for outputting a divisional recording command, when the amount of information to be recorded is greater than the recording capacity for said second frequency of said second magnetic recording region, and wherein, said signal generating circuit generates, (1) when said divisional recording command is issued, said second recording signal representing information which can be recorded within a recording capacity of said second magnetic region and said first recording signal representing information which cannot be recorded on said second magnetic recording region; and (2) when no divisional recording command is issued, said second recording signal representing all of information to be recorded.

19. A camera according to claim 1, wherein said information including at least data and clock information recorded on said first magnetic recording region is transmitted through a first line, and said information including at least data and clock information recorded on said second magnetic recording region is transmitted through a second line separate from said first line.

20. A recorder according to claim 17, wherein said information including at least data and clock information recorded on said first magnetic recording region is transmitted through a first line, and said information including at least data and clock information recorded on said second magnetic recording region is transmitted through a second line separate from said first line.

* * * * *